US010341035B2

(12) United States Patent
Delmas et al.

(10) Patent No.: US 10,341,035 B2
(45) Date of Patent: Jul. 2, 2019

(54) METHOD FOR CONTINUOUSLY PLAYING, ON A CLIENT DEVICE, A CONTENT BROADCAST WITHIN A PEER-TO-PEER NETWORK

(71) Applicants: Streamroot, Inc., Boston, MA (US); Axel Delmas, Paris (FR); Nikolay Rodionov, Paris (FR)

(72) Inventors: Axel Delmas, Paris (FR); Nikolay Rodionov, Paris (FR)

(73) Assignee: STEAMROOT, INC., Boston, MA (US)

( * ) Notice: Subject to any disclaimer, the term of this patent is extended or adjusted under 35 U.S.C. 154(b) by 141 days.

(21) Appl. No.: 15/564,392

(22) PCT Filed: Apr. 7, 2016

(86) PCT No.: PCT/FR2016/050797
§ 371 (c)(1),
(2) Date: Oct. 4, 2017

(87) PCT Pub. No.: WO2016/162639
PCT Pub. Date: Oct. 13, 2016

(65) Prior Publication Data
US 2018/0138998 A1 May 17, 2018

(30) Foreign Application Priority Data
Apr. 7, 2015 (FR) ...................... 15 52976

(51) Int. Cl.
*H04H 20/08* (2008.01)
*H04N 21/231* (2011.01)
(Continued)

(52) U.S. Cl.
CPC ........ *H04H 20/08* (2013.01); *H04N 21/2343* (2013.01); *H04N 21/23113* (2013.01);
(Continued)

(58) Field of Classification Search
CPC ............ H04H 20/08; H04N 21/23113; H04N 21/2343; H04N 21/26258; H04N 21/4335;
(Continued)

(56) References Cited

U.S. PATENT DOCUMENTS 8,037,506 B2 * 10/2011 Cooper ............... H04N 7/1675
725/93
8,423,606 B1 * 4/2013 Streeter ............... H04L 65/4084
709/203

(Continued)

FOREIGN PATENT DOCUMENTS

WO 2006/021909 A1 3/2006
WO 2012/154287 A2 11/2012

OTHER PUBLICATIONS

Preliminary Research Report and Written Opinion received for French Application No. 1552976, dated Mar. 3, 2016, 7 pages (1 page of French Translation Cover Sheet and 6 pages of original document).

(Continued)

*Primary Examiner* — Greg C Bengzon
(74) *Attorney, Agent, or Firm* — Womble Bond Dickinson (US) LLP

(57) ABSTRACT

The present invention relates to a method for continuously reading, on a client device (11), content broadcast within a peer-to-peer network (10) of client devices (11, 12), said content being made up of a sequence of segments, the client device (11) comprising a first buffer memory (M1) provisionally storing at least one raw segment of said content, each raw segment being in a format that is suitable for transfer within the peer-to-peer network (10), the method being characterized in that it includes the implementation by data-processing means (110) of the device (11) of the following steps: (a) converting at least one raw segment (Continued)

from the first buffer memory (M1) into a format suitable for reading on the device (11), and storing said converted segment in a second buffer memory (M2) of the device (11), so that the second buffer memory (M2) stores a number between a minimum number and a maximum number of converted segments arranged upstream from a reading point of said content; (b) reading, from the second buffer memory (M2), at least one fragment of the converted segment arranged at said reading point; (c) deleting, from said second buffer memory (M2), at least one converted segment arranged downstream from said reading point, so that the second buffer memory (M2) stores a number no higher than a maximum number of converted segments arranged downstream from a reading point of said content, the associated raw segment being stored provisionally in the first buffer memory (M1).

12 Claims, 4 Drawing Sheets

(51) Int. Cl.
| | | |
|---|---|---|
| *H04N 21/2343* | (2011.01) | |
| *H04N 21/262* | (2011.01) | |
| *H04N 21/4335* | (2011.01) | |
| *H04N 21/4402* | (2011.01) | |
| *H04N 21/63* | (2011.01) | |
| *H04N 21/845* | (2011.01) | |

(52) U.S. Cl.
CPC ... *H04N 21/26258* (2013.01); *H04N 21/4335* (2013.01); *H04N 21/4402* (2013.01); *H04N 21/632* (2013.01); *H04N 21/8456* (2013.01)

(58) Field of Classification Search
CPC ............ H04N 21/4402; H04N 21/632; H04N 21/8456; H04N 21/2347; H04N 21/23473; H04N 21/23476; H04N 21/2401; H04N 21/440218; H04N 21/440245; H04N 21/4408; H04N 21/845; H04N 21/8455; H04N 21/2387; H04N 21/6125; H04N 21/812; H04N 21/2743; H04N 21/2747; H04N 21/4788; H04N 21/23418; H04N 21/23424; H04N 21/23805; H04N 21/2625; H04N 21/47202; H04N 21/4825; H04N 21/6371; H04N 21/6373; H04N 21/6377; H04N 21/6587; H04N 21/4622; H04N 21/47217; H04N 21/23116; H04N 21/23439; H04N 21/85406; H04N 19/15; H04N 19/172; H04N 19/40; H04N 19/436; H04N 19/587; H04N 21/234309; H04N 21/234381; H04N 21/2402; H04N 21/4307; H04N 21/4341; H04N 21/44; H04N 21/44004; H04N 21/440281; H04N 21/6131; H04N 21/6181; H04N 21/8543; H04N 5/272; H04L 65/4084; H04L 65/607; H04L 65/80; H04L 65/608; H04L 67/02; H04L 67/1097; H04L 65/4069; H04L 67/10; H04L 65/00; H04L 65/602; H04L 65/60; G06F 16/125; G06F 16/152; G06F 16/43; G06F 16/783; G06F 16/951; G06F 16/71; G06F 3/14; G06F 9/445; H04M 1/72558; G11B 27/034; G11B 27/10; G11B 27/28
See application file for complete search history.

(56) References Cited

U.S. PATENT DOCUMENTS

| | | | | |
|---|---|---|---|---|
| 8,532,643 | B2* | 9/2013 | Panei | H04L 65/80 |
| | | | | 455/419 |
| 8,601,506 | B2* | 12/2013 | Harwell | H04N 21/2343 |
| | | | | 725/116 |
| 9,066,115 | B1* | 6/2015 | Cherry | H04N 21/23424 |
| 9,532,092 | B1* | 12/2016 | Suryanarayanan | |
| | | | | H04N 21/2662 |
| 9,578,395 | B1* | 2/2017 | Qureshi | H04N 21/8455 |
| 9,736,236 | B2* | 8/2017 | Kim | H04L 65/607 |
| 2008/0256255 | A1* | 10/2008 | Mordovskoi | H04N 21/2381 |
| | | | | 709/231 |
| 2009/0150480 | A1* | 6/2009 | Xia | H04L 65/602 |
| | | | | 709/203 |
| 2012/0016965 | A1* | 1/2012 | Chen | H04N 21/23439 |
| | | | | 709/219 |
| 2012/0054616 | A1* | 3/2012 | Mittal | H04N 21/41407 |
| | | | | 715/722 |
| 2012/0122438 | A1* | 5/2012 | Renou | H04L 65/80 |
| | | | | 455/414.4 |
| 2012/0233345 | A1* | 9/2012 | Hannuksela | H04N 21/26258 |
| | | | | 709/231 |
| 2012/0254456 | A1* | 10/2012 | Visharam | H04N 21/2343 |
| | | | | 709/231 |
| 2012/0265853 | A1* | 10/2012 | Knox | H04N 21/2187 |
| | | | | 709/218 |
| 2013/0024901 | A1* | 1/2013 | Sharif-Ahmadi | H04L 41/12 |
| | | | | 725/114 |
| 2013/0031211 | A1* | 1/2013 | Johnson | H04N 21/23103 |
| | | | | 709/218 |
| 2013/0044260 | A1* | 2/2013 | Vestergaard | G06F 3/14 |
| | | | | 348/515 |
| 2013/0159546 | A1* | 6/2013 | Thang | H04L 65/4084 |
| | | | | 709/231 |
| 2013/0322847 | A1* | 12/2013 | Anderson | H04N 21/26258 |
| | | | | 386/240 |
| 2014/0012898 | A1* | 1/2014 | Mittal | H04N 21/41407 |
| | | | | 709/203 |
| 2014/0019593 | A1* | 1/2014 | Reznik | H04L 65/60 |
| | | | | 709/219 |
| 2014/0344415 | A1* | 11/2014 | Liu | H04N 19/162 |
| | | | | 709/219 |
| 2015/0067722 | A1* | 3/2015 | Bjordammen | H04N 21/2625 |
| | | | | 725/32 |
| 2015/0095460 | A1* | 4/2015 | Berger | H04L 67/06 |
| | | | | 709/219 |
| 2015/0324379 | A1* | 11/2015 | Danovitz | H04N 21/2743 |
| | | | | 707/825 |
| 2015/0365450 | A1* | 12/2015 | Gaunt | H04L 65/4084 |
| | | | | 709/231 |
| 2015/0381690 | A1* | 12/2015 | Schmidt | H04L 65/4069 |
| | | | | 709/231 |
| 2016/0088054 | A1* | 3/2016 | Hassan | H04L 65/80 |
| | | | | 709/219 |
| 2016/0173959 | A1* | 6/2016 | Seema | H04N 21/8456 |
| | | | | 725/116 |
| 2016/0192029 | A1* | 6/2016 | Bergstrom | H04L 43/0882 |
| | | | | 725/109 |
| 2017/0006314 | A1* | 1/2017 | Danovitz | H04L 67/1097 |

OTHER PUBLICATIONS

International Search Report and Written Opinion received for PCT Patent Application No. PCT/FR2016/050797, dated Jun. 7, 2016, 16

(56) References Cited

OTHER PUBLICATIONS pages (7 pages of English Translation and 9 pages of Original Document).

International Preliminary Report on Patentability received for PCT Patent Application No. PCT/FR2016/050797, dated Oct. 19, 2017, 14 pages (7 pages of English Translation and 7 pages of Original Document).

* cited by examiner

METHOD FOR CONTINUOUSLY PLAYING, ON A CLIENT DEVICE, A CONTENT BROADCAST WITHIN A PEER-TO-PEER NETWORK

GENERAL TECHNICAL FIELD

The present invention relates to streaming.

More precisely, it relates to a method for continuously playing a content broadcast within a peer-to-peer network.

STATE OF THE ART

"Streaming" designates a "direct" audio or video stream playing technique, that is while it is recovered from the Internet by a client device. Thus, it is in contrast with downloading, which requires to recover all the data of the audio or video content before being able to play it.

In the case of streaming, storing the content is temporary and partial, since data are continuously downloaded in a buffer of the client (typically the random access memory), analysed on the fly by its processor and quickly transferred to an output interface (a screen and/or loudspeakers) and then replaced with new data.

Traditionally, the content is provided by a streaming server. The client desiring to access it sends a request to recover first segments therefrom (by segment, it is intended a data block of the content, corresponding generally to a few seconds of playing). When there is sufficient data in the buffer to enable the beginning of the content to be played, playing starts. In the background, the stream downloading continues in order to uninterruptedly supply the buffer with the remaining part of the content.

However, it is noticed that this approach has limits if a great number of clients desire to play the same content simultaneously: the server is found to be saturated, being incapable of providing the content at a sufficient rate for playing to be fluid, and stuttering occur.

Recently, an alternative strategy based on "peer-to-peer" (P2P) has been suggested, in which each client acts as a server for other clients: they are called peers. A peer which has started playing the content will forward to others segments it has already received, and so on, hence an easier broadcasting regardless of the number of clients being interested. This strategy is described in the international application WO 2012/154287.

However, although P2P is extremely efficient for downloading files, difficulties occur when it is used for streaming.

One requirement is concerned with the fact that to be exchanged in P2P, data have to be maintained in an adapted specific format (typically in Javascript if API WebRTC is used), which format is not readable as such by video players. Thus, thanks to an API such as Media Source Extension, P2P segments are converted into a video stream.

This technique give satisfaction, but the Applicant has noticed that it turns out to be heavy.

Indeed, segments converted into video streams fill a video buffer for playing. The data thus have to be stored twice, which can quickly saturate the cache, and result in slowing-downs and disturbances for the user. This is all the more a problem in the case of a VOD, "Video On Demand", or non-real time video (as opposed to "live streaming" which will be described later), wherein it is desirable to maximise the size of the P2P cache so as to increase the chances that caches of two peers join together and that exchanges are possible.

The present invention improves the situation by providing a novel method for managing P2P streaming data, in particular VOD, which is optimal in terms of content broadcasting efficiency, overall space of the buffers of the peers, and algorithmic simplicity.

DISCLOSURE OF THE INVENTION

The present invention thus relates to a method for continuously playing, on a client device, a content broadcast within a peer-to-peer network of client devices, said content consisting of a sequence of segments, the client device comprising a first buffer temporarily storing at least one raw segment of said content, each raw segment being in a format adapted for transferring within the peer-to-peer network, the method being characterised in that it comprises the implementation, by data processing means of the device, of the steps of:

(a) converting in a format adapted for playing on the device at least one raw segment of the first buffer, and storing said segment converted in a second buffer of the device, such that the second buffer stores a number between a minimum number and a maximum number of converted segments arranged upstream of a playing point of said content;

(b) playing from the second buffer at least one fragment of the converted segment arranged at said playing point;

(c) deleting from said second buffer at least one converted segment arranged downstream of said playing point, such that the second buffer stores a number lower than or equal to a maximum number of converted segments arranged downstream of the playing point of said content, the associated raw segment being temporarily maintained in the first buffer.

According to further advantageous and non-limiting characteristics:

step (a) comprises prior requesting said raw segment from the other client devices of the peer-to-peer network;

step (a) comprises receiving said raw segment from a content server connected to the peer-to-peer network if it could not be wholly recovered from another device of the peer-to-peer network;

said format of the raw segments is not adapted for playing on the device, and said converted format of the segments is not adapted for transferring within the peer-to-peer network;

the raw segments are encapsulated in Javascript, and the converted segments are encapsulated in a player via on HTML5 video tag or a Flash module;

the minimum number and the maximum number of converted segments arranged upstream of a playing point of said content are such that the second buffer contains between 5 and 100 seconds, preferably between 15 and 60 seconds, of upstream segments;

the maximum number of converted segments arranged downstream of a playing point of said content is such that the second buffer contains less than 30 seconds, preferably less than 20 seconds, preferably less than 10 seconds, of downstream segments;

the method comprises:

firstly checking at a first periodicity that the second buffer stores a number higher than said minimum number of converted segments arranged upstream of said playing point; and/or secondly checking at a second periodicity that the second buffer stores a number lower than said maximum number of converted segments arranged downstream of said playing point;

the method comprising the implementation of step (a) in a case where the first check has a negative result, and the implementation of step (c) in a case where the second check has a negative result;

the first periodicity is at least ten times higher than the second periodicity;

the second periodicity is such that the time interval between two implementations of the second check is lower than the content duration corresponding to the maximum number of downstream segments stored in the second buffer;

the data processing means of the device are configured to maximise the number of raw segments stored in the first buffer.

According to a second aspect, there is provided a client device of a peer-to-peer network of client devices, characterised in that it comprises a first buffer temporarily storing at least one raw segment of a content consisting of a sequence of segments, each raw segment being in a format adapted for transferring within a peer-to-peer network;

a second buffer temporarily storing at least one converted segment of said content, each converted segment corresponding to a raw segment converted into a format adapted for playing on the device;

data processing means configured for implementing:

a module for converting a raw segment of the first buffer, and storing said converted segment in the second buffer;

a module for playing from the second buffer at least one fragment of a converted segment arranged at a playing point of said content;

a module for deleting from said second buffer at least one converted segment arranged downstream of said playing point, the converting and deleting modules being configured such that the second buffer stores a number between a minimum number and a maximum number of converted segments arranged upstream of said playing point, and a number lower than or equal to a maximum number of converted segments arranged downstream of said playing point.

According to a third and a fourth aspect, the invention respectively relates to a computer program product comprising code instructions for executing a method according to the first aspect of the invention for continuously playing on a client device a content broadcast within a peer-to-peer network of client devices when said program is executed on a computer; and a storage means readable by a computing device on which a computer program product comprises code instructions for executing a method according to the first aspect of the invention, for continuously playing on a client device a content broadcast within a peer-to-peer network of client devices.

DESCRIPTION OF THE FIGURES

Further characteristics and advantages of the present invention will appear upon reading the description that follows of a preferential embodiment. This description will be given in reference to the appended drawings in which.

DETAILED DESCRIPTION

Architecture

Figure 1:
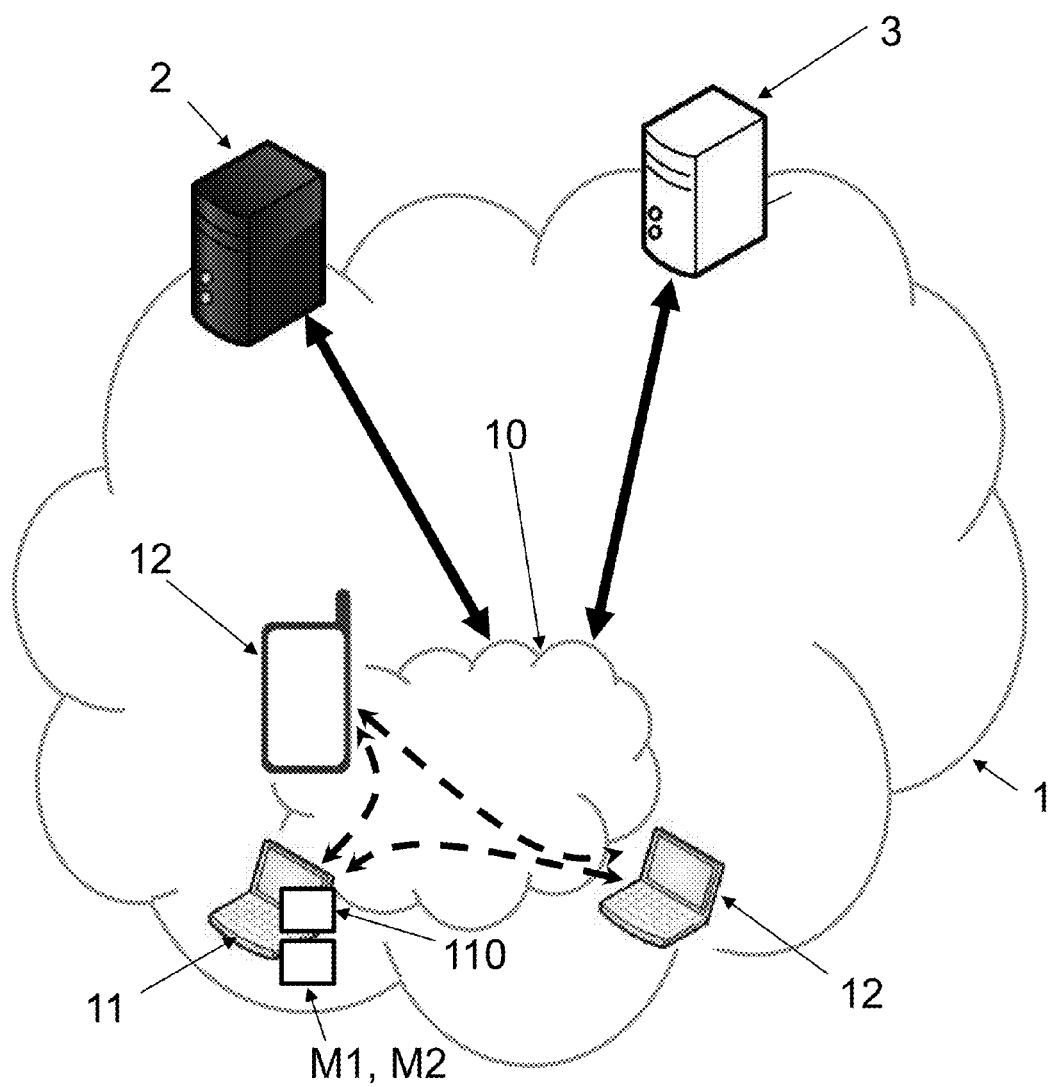
FIG. 1 represents an architecture for implementing the method according to the invention.

In reference to FIG. 1, the invention relates to a method for continuously playing a content broadcast within a network 1 as represented. The network 1 is herein a large scale telecommunications network and in particular the Internet. This network 1 comprises a peer-to-peer network 10 of client devices 11, 12. Each client device 11, 12 is typically a personal computing device such as a smartphone, a PC, a tablet, etc. connected to the network 1, having data processing means 110 such as a processor, an interface for playing the content, and having two buffers M1 and M2, typically two zones of a random access memory, each being able to store (in a different way as will be seen) all or part of the content temporarily (by temporarily, it is meant that the segments are deleted from this memory shortly after they have been played: they are not stored in the long term as is the case for a direct downloading). As will be seen later, in the preferred case of playing via a browser, all the segments are typically deleted (i.e. the buffers are reinitialised) at the latest when the browser or tab in which the video is played is closed.

The first buffer M1 is called "peer-to-peer cache". It stores segments under a so-called "raw" format. By raw segments, it is meant a format adapted for transferring within the peer-to-peer network 10 (we will see how later), but not adapted for playing on the device 11.

The second buffer M2 is called "video buffer". It stores segments under a so-called "converted" format. By converted segments, it is meant converted from the raw segments under a format adapted for playing on the device 11, but not adapted for transferring within the peer-to-peer network 10.

Figure 2:
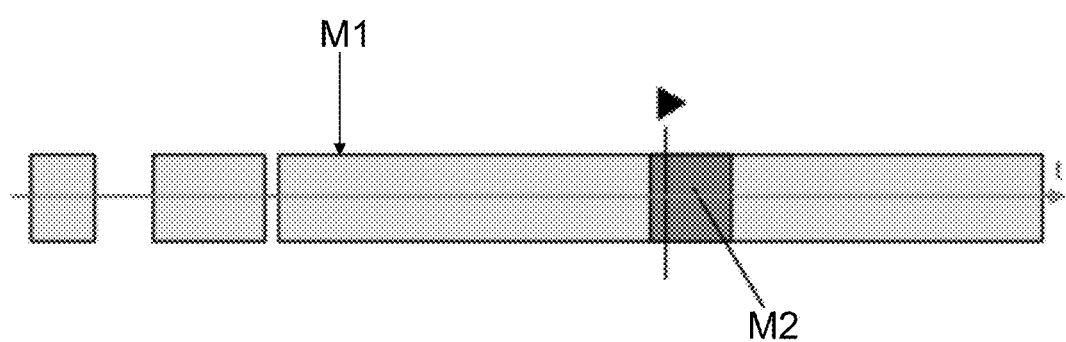
FIG. 2 illustrates an exemplary use of buffers in one embodiment of the method according to the invention.

As will be seen in FIG. 2 which will be described later, even if all the raw segments (respectively converted segments) form preferably a single interval (i.e. these segments are consecutive and forming a subsequence of the sequence of segments making up the content), there can be disjoined intervals if for example the user manually moves the playing point in the video, for example so as to rewind.

As explained in the introductive part, these devices 11, 12 are "peers" (also called "nodes") of the peer-to-peer network 10.

By "client devices 11, 12 of a peer-to-peer network 10", it is meant devices connected in the network 1 by a peer-to-peer network protocol. In other words, the data processing means for each peer implements a particular program (client software), which can be integrated to a web browser, a mobile application, or any other embedded software (for example a player of an internet access box, or a multimedia box, i.e. a "Set-top box"), for using the peer-to-peer.

Indeed, a peer-to-peer network, or P2P, is a decentralised sub-network within the network 1, wherein data can be directly transferred between two client devices 11, 12 of the network 10, without passing through a central server. Thus, it enables all the client devices 11, 12, to play both the role of client and server. The peers 11, 12 are thus defined as "seeders" (or data suppliers) and/or "leechers" (or data receivers).

Said content, which is in particular an audio or video content, that is a media of some length, consists of a sequence of segments (called a "playlist") stored on data storage means of a server 2 connected to the peer-to-peer network 10. The segments have a predetermined length, typically one or two seconds of the content, but it can range from a fraction of a second to about ten seconds. All the segments of a given content have generally the same length.

The server 2 is a content server, advantageously present in the network 1 and connected to the peer-to-peer network 10. In other words, this is one (or more) server(s) of the Internet network 1 providing the segments of various contents in accordance with a given streaming protocol. For example, the HLS ("HTTP Live Streaming") will be mentioned, in which segments are "ts" files, listed in a "m3u8" playlist file. HLS involves the MPEG2 format for the content. DASH, Smooth streaming, or HDS streaming protocols will also be mentioned. The raw segments are encapsulated for example in JavaScript, so as to allow exchange between peers of these segments via a WebRTC type API.

The server 2 is the primary source of the segments, insofar as initially no peer has the content (before a first transfer of the server 2 to this peer 11, 12). The contents are either at the very beginning stored integrally on the server 2 (case of the VOD previously discussed), or generated in real time (case of the live streaming), and in the latter case, the list of segments making it up dynamically changes over time.

Live streaming proposes to broadcast in real time contents associated with "live" events, for example concerts, meetings, sports events, video games, etc., which are simultaneously happening. With respect to streaming of an already integrally existing content as a film, a live streaming broadcast content is actually generated gradually as the associated event happens. Technically, as in the case of a live event on TV, such a content can only be broadcast with some delay, which the user wishes to be as small as possible. This delay is typically in the order of one minute, but can go down to about twenty seconds. Thereby, a playlist of only a few segments (at most some tens) is available at each instant, the segments of this list being dynamically renewed in accordance with a turnover: as the event happens, new segments are created, "age", are received and played by clients (at the end of the expected delay), and finally exit the list.

In the latter case (live streaming), the content should rather be seen as a continuous stream. The sequence of segments is thereby dynamic, that is it is regularly updated. Each time a new segment is generated, it is added at the end of the sequence, and the first segment of the sequence (the oldest) is deleted. All the others are offset according to a turnover mechanism which can be related to a FIFO list. The first segment of the list (the oldest one) can be that at the playing point, in other words the "live" segment (and thus the segments are deleted from the playlist as soon as they are played), or a "past" segment if the content server accepts that the content is played with some delay (some platforms provide live streaming with up to a 2 h delay, this is what is called DVR ("Digital Video Recorder").

Preferably, the present method is implemented in a context of VOD or DVR.

To the peer-to-peer network 10 is also connected a peer management server 3 called a "tracker". The tracker 3 has data processing means and storage means. It coordinates exchanges between peers 12, 13 (by controlling the client software implemented by each of the client devices 11, 12), but it is not directly involved in data transfer and does not have a copy of the file.

On the other hand, it communicates with the content server 2. For each of the contents stored on this server 2, the tracker 3 receives (upon request or by push) from the server 2 a "manifest" file for each of the contents. This manifest file is a description of the content (in the XML format for most of streaming protocols except for HLS), and contains in particular the list of the segments. The tracker 3 then parses the manifest file so as to extract the list of the segments.

In the case of live streaming, the manifest file is generally retransmitted at regular intervals so as to allow an update of the playlist (it is reminded that as the content is generated live, new segments continuously enter the playlist and others leave it when they have become too old and have gone beyond the play point). Alternatively, a manifest template (that is without the list of the segments) is provided accompanied with time indications (including a "timestamp") making it possible to determine when each new segment is transmitted, which enables the tracker 3 (and the client devices 11, 12) to complete this template and to update it on its own.

For each manifest file (obtained as complete or the playlist of which has been automatically completed), the tracker 3 makes a "hash", that is implements a hash function so as to obtain a digest of the manifest file, which makes up a signature of the content to which the manifest file is associated. It is to be noted that the hash can be implemented on the address of the manifest file (its URL, "Uniform Resource Locator"), which is interesting since an URL remains constant even if the manifest file regularly changes (because of the live streaming).

Playing

In the following of the present description, the object is a client device 11 which is optionally recovering the content from other devices 12 and/or the server 2, that is the first buffer M1 stores already at least one raw segment, if possible a subsequence of the sequence making up the content.

The method thereby begins by implementing by the processing means 110 of the device a step (a) of converting into a format adapted for playing on the device 11 at least one raw segment of the first buffer M1. This step consists in transforming the raw segment into a converted segment, which could be play by the player of the device 11 unlike the first one.

The client device 11 is typically ready for continuously playing the content after a minimum duration of preloading segments in the second buffer M2 (the preloaded segments being most often recovered in the first buffer M1 from the server 2), for example ten seconds (that is ten segments of one second).

Preferably, the player is an integrated player of an HTML5 compatible browser, and the conversion consists in injecting video data of the segment by virtue of the API Media Source Extension of the browser, after which they are stored in the second buffer M2 and are no longer accessible. In the case of the browser, an HTML5 <video> tag thereby enables controls on the integrated player (play, pause, fast forward, etc.) to be offered, in the manner of what is offered by a user control interface.

That is why the raw version of the segment is maintained in the first buffer M1 so as to always allow its share in the network 10. It is noted that the present method is not limited to the use of HTML5 tag coupled with the API Media Source Extension, and that a Flash module could for example be used, or even a module natively integrated in any player. For example, the player can be that integrated on a mobile application (for example Objet-C, C++, etc. natively compatible). In any case, the problem of non-accessibility of the data once they have been injected in the player will arise.

The choice of the segment to be converted is such that the second buffer M2 stores a minimum number of converted segments arranged upstream of a playing point of said content. By "upstream", it is meant future segments, that is which are arranged in the content subsequently (from a time point of view) to the playing point, i.e. which have not been played yet, and preferably the $s_{min+}$ next consecutive segments of the sequence of segments making up the content, $s_{min+}$ being said minimum number of upstream segments. In the following of the present description, upstream segments are intended to designate these converted segments arranged upstream of the playing point.

Thus, in a preferred way, this minimum number of upstream segments is expressed as a playing time. For example, if it is defined that the second buffer should contain a minimum time of upstream segments of 15 s (advantageously 10 s, even 5 s in a particularly optimised management), thereby in the case of segments of one second, the minimum number of upstream segments that have to be stored by the second memory is fifteen.

If the first memory M1 does not contain raw segments enough to fulfil this minimum number (i.e. if the segments have not been sufficiently quickly recovered from other devices 12), then the missing segment(s) is (are) (all or part) recovered from the server 2.

In a more unusual way, the number of upstream segments stored by the second cache M2 also fulfils a maximum number $s_{max+}$. Thus, the number of these upstream segments is between two extreme values. The aim is to reduce the media buffer (the second buffer M2) to a reduced zone located about the playing point. Thus, unlike what could be made in prior art where each raw segment was converted, which resulted in requiring to mobilise twice the size of the P2P cache, the present method provides in reference to FIG. 2 to decouple both buffers M1 and M2 by maximising the first one (so as to facilitate exchanges within the peer-to-peer network 10 by ensuring a larger availability of data) and by minimising the first one (since data it contains cannot be shared anymore. It is thus useless to put too much upstream data in the second buffer M2, a fortiori if it is known that this data is already in the first buffer M1.

By expressing this minimum number of upstream segments as a playing time, a duration between 100 s and 40 s, advantageously about 60 s (that is for example sixty segments of one second) is advantageously chosen as a maximum upstream duration.

In a most often simultaneous way, the device 11 implements a step (b) of playing by the processing means 110 (generally on the fly) from the second buffer M2 at least one fragment of the converted segment arranged at said playing point. The played fragment is restored on an output interface of the device 11. The playing point is thus offset in real time to the upstream segments.

This causes a step (c) of deleting from said second buffer M2 at least one converted segment arranged downstream of said playing point (in opposition to upstream, in other words in the already played segments), such that the second buffer M2 stores a maximum number $s_{max+}$ of converted segments arranged downstream of a playing point of said content. Indeed, it is not necessary to keep the converted segments after playing, unless the user decides to interrupt playing and rewing some seconds (for example if the user has been disturbed by noise). In the following of the present description, by downstream segments, it is intended to designate these converted segments arranged downstream of the playing point. A maximum time of 30 s, or even 20 s, or even 10 s of downstream segments is quite sufficient. A minimum number of downstream segments is not necessary.

This enables the size of the second buffer M2 to be further minimised so as to maximise the performance of the device 11. On the other hand, the raw segment being associated (to the converted segment being deleted) is temporarily maintained in the first buffer M1, so as to keep the maximum data in the same.

Generally, it will be understood that the data processing means of the device 110 are advantageously configured to maximise the number of raw segments stored in the first buffer M1. By way of example, in the case of VOD, between 100 and 150 Mo of content can be kept in the first buffer M1. It corresponds to about 15-20 mn of content at 1 Mbit/s (a fairly standard rate in the on-line video). The highest rates are commonly 3.5 Mbit/s for a site which provides high definition, or even higher than 12-15 Mbit/s for "4K" Ultra High Definition contents, and the rates are necessarily much higher (>12-15 Mbit/s with current encodings).

For Live Streaming, the content existing at each instant is short enough owing to the turnover and far less raw segments are stocked in the first buffer M1 (about 20 Mo), but this size will probably increase for high rates (about 50 Mo, and even come back to the size of the first buffer M1 which is comparable to the one that can be seen in VOD for DVR).

Recurrence

Figure 3A:
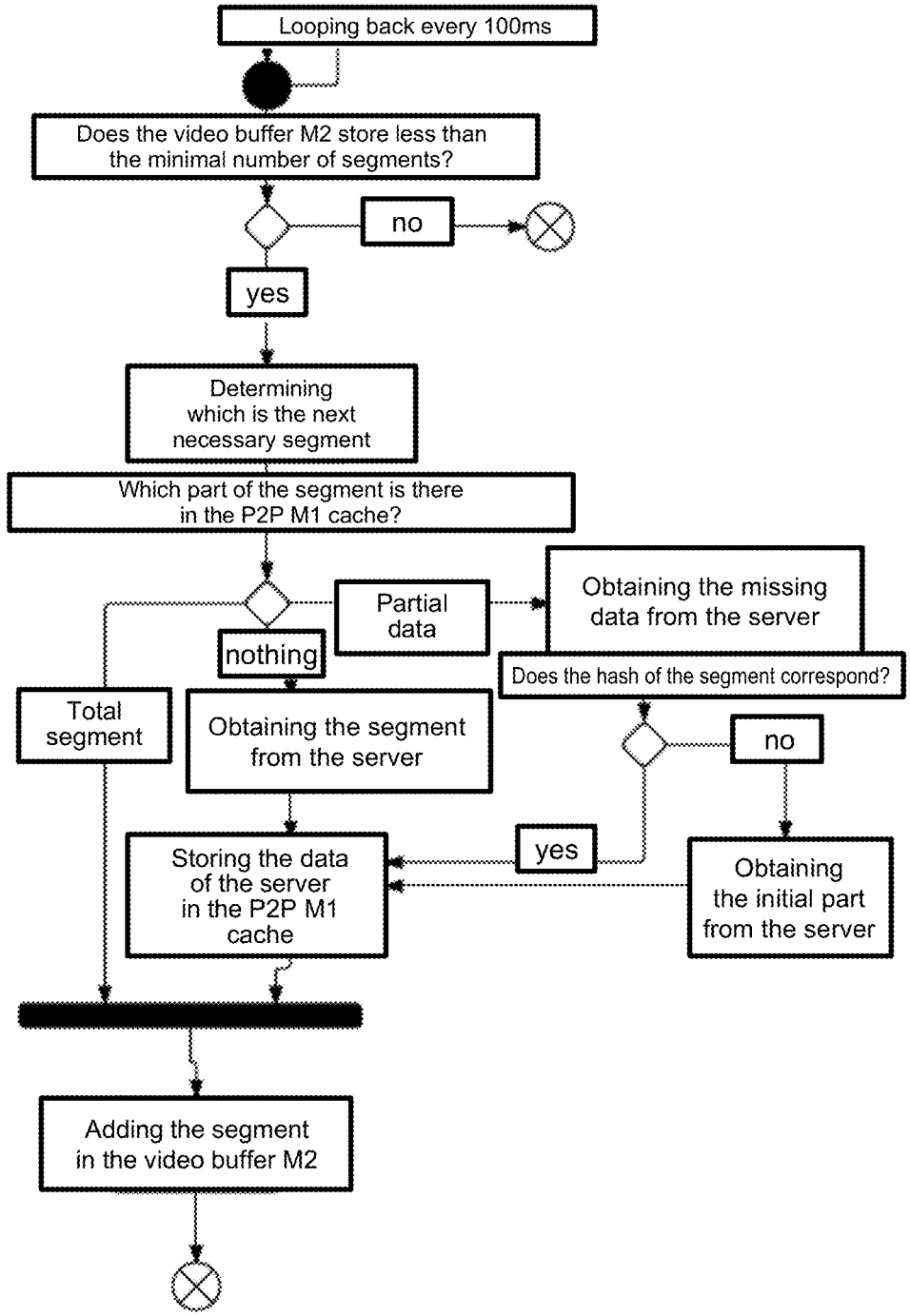
FIGS. 3a and 3b are logic diagrams illustrating a preferred embodiment of steps (a) and (c) according to the invention respectively.
Figure 3B:
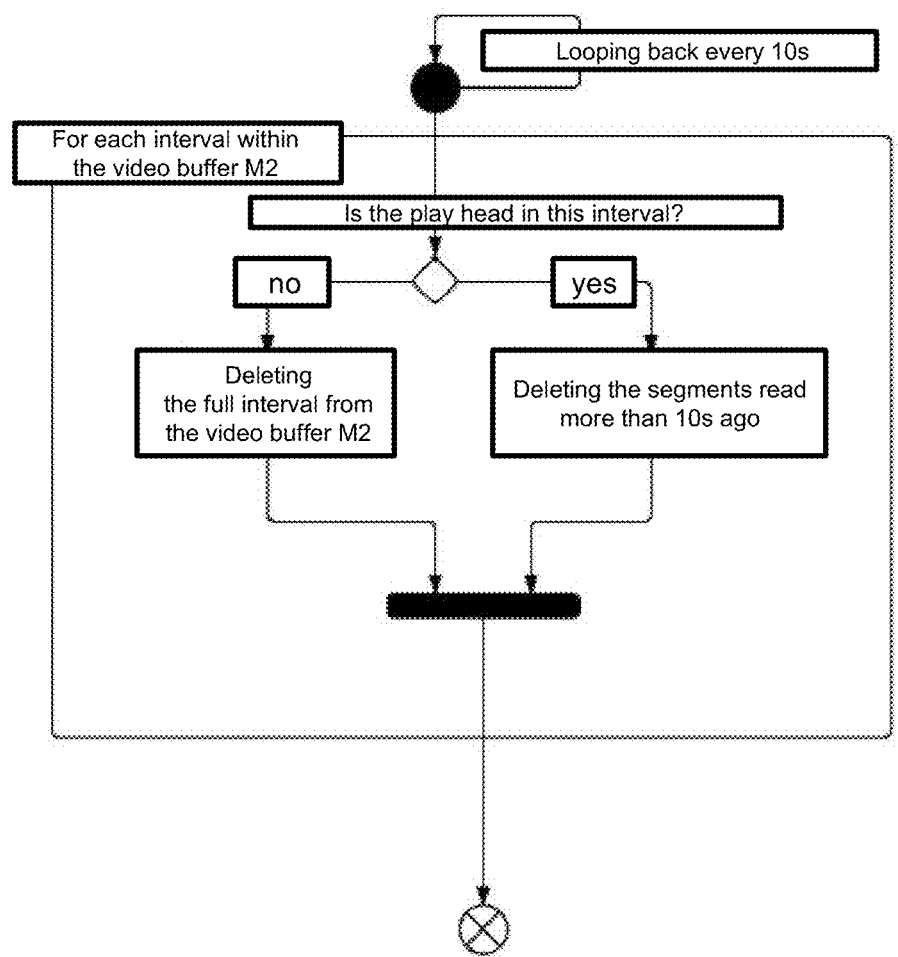

In reference to FIGS. 3a and 3b, steps (a) and (c) are each repeated at regular intervals. More precisely, at regular intervals, tests are implemented on the numbers of upstream and downstream converted segments so as to check whether they are in the predetermined intervals. In the negative case, step (a) and/or step (c) are implemented. More concretely, the method comprises:

firstly checking at a first periodicity that the second buffer M2 stores a number higher than the minimum number of converted segments arranged upstream of said playing point; and/or secondly checking at a second periodicity that the second buffer M2 stores a number lower than the maximum number of converted segments arranged downstream of said playing point.

In other words, the first check consists in checking the presence in the second buffer M2 of an acceptable number of upstream converted segments, and the second check consists in checking the presence of an acceptable number in the second buffer M2 of downstream segments. The method thus comprises the implementation of step (a) in a case where the first check is negative (i.e. if there is not enough upstream segments), and the implementation of step (c) in a case where the second check is negative (i.e. if there are too many downstream segments). Thus, steps (a) and (c) are implemented in a more or less regular way as a function of the results of tests. It is noted that if the second check reveals that the second buffer M2 stores a number higher than a maximum number of converted segments arranged upstream of said playing point, then the data processing means 110 actually block the implementation of step (a) as long as this excess of segments has not been resorbed. This will be naturally the case as soon as the playing point will have advanced after playing has progressed.

Step (b) will be considered as implemented continuously such that playing is never interrupted, for the comfort of the user.

FIG. 3a shows the case of step (a), that is the first check, which is advantageously implemented at a first periodicity of about every 100 ms (i.e. the first check is implemented about ten times per second). If a segment is missing in the second buffer M2, the data processing means 1110 check whether the segment is in the first buffer M1, and optionally implements step (a). Otherwise, the segment is all or partially recovered beforehand from the content server 2. A "hash" test is implemented optionally (if the segment comes all or partially from the peer-to-peer network 10) to check the integrity of the raw segment before converting it.

FIG. 3b shows the case of step (c), that is the second check, which is advantageously implemented in a recurrent but much rarer way than the first check, i.e. at least ten times less often, or even one hundred times less often (in other words, the first periodicity is ten or even one hundred times smaller than the second periodicity). It is actually important that the first check is performed very often to avoid the risk that there is more upstream segments and that the user has to wait (which is called "rebuffering"), whereas an excess of downstream segments has no adverse consequences for the user (besides a memory overconsumption).

Typically, the second periodicity is such that the duration between two second checks is lower than the duration corresponding to the maximum number of downstream converted segments in the second buffer M2, advantageously about equal, that is typically 10 s. Indeed, insofar as the number of downstream segments only increases, too low a periodicity of the second check would cause that the downstream segments of the second memory M2 would not be sufficiently often purged and that their number would be on average much higher than the maximum acceptable value. In the contrary, too higher a frequency of the second check is useless and consumes resources of the data processing means 11.

The first and/or second checks are on the other hand implemented for each "interval", that is as explained each continuous subsequence of segments.

If the playing point is not in this interval, it is because it is a dead interval (the existence of which is for example caused either by a manual rewing by the user to a past point distant from the content, to see again a particular detail, or to a skip in the future, causing the recovering from the first buffer M1 of the associated segments since the periodicity of the first check is much lower than that of the second check), all the converted segments of the same are thus advantageously deleted from the second buffer M2.

If the playing point is in this interval ("active" interval such as the interval visible in FIG. 2), then step (c) is implemented, and thus the oldest converted segments are deleted such that the second buffer M2 stores a maximum number of converted segments arranged downstream of a playing point of said content.

Device and Computer Program Product

According to a second aspect, the invention relates to a client device 11 for implementing the present method of playing a content.

This device 11 comprises as explained:
a first buffer M1 temporarily storing at least one raw segment of a content consisting of a sequence of segments, each raw segment being in a format adapted for transferring within a peer-to-peer network (10) (and advantageously not adapted for playing on the device 11);
a second buffer M2 temporarily storing at least one converted segment of said content, each converted segment corresponding to a raw segment converted into a format adapted for playing on the device 11 (and in particular not adapted for transferring within the peer-to-peer network 10); and
data processing means 110.

The data processing means 110, typically a processor, are configured for implementing:

a module for converting a raw segment of the first buffer M1, and storing said converted segment in the second buffer M2;
a module for playing from the second buffer (M2) at least one fragment of a converted segment arranged at a playing point of said content;
a module for deleting from said second buffer M2 at least one converted segment arranged downstream of said playing point,
the converting and deleting modules being configured such that the second buffer M2 stores as explained a number between a minimum number and a maximum number of converted segments arranged upstream of said playing point, and a number lower than or equal to a maximum number of converted segments arranged downstream of said playing point.

According to other aspects, the invention relates to a computer program product comprising code instructions for executing (on data processing means, in particular those of the client device 11) a method according to the first aspect of the invention for continuously playing on a client device 11 a content broadcast within a peer-to-peer network 10 of client devices 11, 12, as well as storing means readable by a computing device (for example a memory of this client device 11) on which this computer program product is found.

The invention claimed is:

1. A method for continuously playing, on a client device (1) a content broadcast within a peer-to-peer network (10) of client devices (11, 12), said content including a sequence of segments, the client device (11) comprising a first buffer (M1) temporarily storing at least one raw segment of said content, each raw segment being in a format adapted for transferring within the peer-to-peer network (10), the method comprising:
(a) converting in a format adapted for playing on the device (11) at least one raw segment of the first buffer (M1), and storing said segment converted in a second buffer (M2) of the device (11), such that the second buffer (M2) stores a number between a minimum number and a maximum number of converted segments arranged upstream of a playing point of said content;
(b) playing from the second buffer (M2) at least one fragment of the converted segment arranged at said playing point;
(c) deleting from said second buffer (M2) at least one converted segment arranged downstream of said playing point, such that the second buffer (M2) stores a number lower than or equal to a maximum number of converted segments arranged downstream of the playing point of said content, the associated raw segment being temporarily maintained in the first buffer (M1),
(d) firstly checking at a first periodicity that the second buffer (M2) stores a number higher than said minimum number of converted segments arranged upstream of said playing point; and/or
(e) secondly checking at a second periodicity that the second buffer (M2) stores a number lower than said maximum number of converted segments arranged downstream of said playing point;
(f) the method further comprising the implementation of said step (a) in a case where the firstly checking has a negative result, and the implementation of said step (c) in a case where the secondly checking has a negative result;
wherein said format of the raw segments is not adapted for playing on the device (11), and said converted format of the segments is not adapted for transferring within the peer-to-peer network (10).

2. The method according to claim 1, wherein step (a) comprises prior requesting said raw segment from the other client devices (12) of the peer-to-peer network (10).

3. The method according to claim 2, wherein step (a) comprises receiving said raw segment from a content server (2) connected to the peer-to-peer network (10) if it could not be wholly recovered from another device (12) of the peer-to-peer network (10).

4. The method according to claim 1, wherein the raw segments are encapsulated in Javascript, and the converted segments are encapsulated in a player via an HTML5 video tag or a Flash module.

5. The method according to claim 1, wherein the minimum number and the maximum number of converted segments arranged upstream of a playing point of said content are such that the second buffer (M2) contains between 5 and 100 seconds, preferably between 15 and 60 seconds, of upstream segments.

6. The method according to claim 1, wherein the maximum number of converted segments arranged downstream of a playing point of said content is such that the second buffer (M2) contains less than 30 seconds of downstream segments.

7. The method according to claim 1, wherein the first periodicity is at least ten times higher than the second periodicity.

8. The method according to claim 1, wherein the second periodicity is such that the time interval between two implementations of the secondly checking is lower than the content duration corresponding to the maximum number of downstream segments stored in the second buffer (M2).

9. The method according to claim 1, wherein the client device is configured to maximise the number of raw segments stored in the first buffer (M1).

10. A client device (11) of a peer-to-peer network (10) of client devices (11, 12), comprising:
   a first buffer (M1) temporarily storing at least one raw segment of a content including a sequence of segments, each raw segment being in a format adapted for transferring within a peer-to-peer network (10);
   a second buffer (M2) temporarily storing at least one converted segment of said content, each converted segment corresponding to a raw segment converted into a format adapted for playing on the device (11);
   data processing means (110) configured for executing:
      instructions for converting a raw segment of the first buffer (M1), and storing said converted segment in the second buffer (M2);
      instructions for playing from the second buffer (M2) at least one fragment of a converted segment arranged at a playing point of said content;
      instructions for deleting from said second buffer (M2) at least one converted segment arranged downstream of said playing point,
      the converting and deleting instructions being configured such that the second buffer (M2) stores a number between a minimum number and a maximum number of converted segments arranged upstream of said playing point, and a number lower than or equal to a maximum number of converted segments arranged downstream of said playing point;
      instructions for firstly checking at a first periodicity that the second buffer (M2) stores a number higher than said minimum number of converted segments arranged upstream of said playing point; and/or
      instructions for secondly checking at a second periodicity that the second buffer (M2) stores a number lower than said maximum number of converted segments arranged downstream of said playing point;
   wherein the execution of said converting instructions takes place in a case where the first check has a negative result, and the execution of said deleting instructions takes place in a case where the second check has a negative result;
   wherein said format of the raw segments is not adapted for playing on the device (11), and said converted format of the segments is not adapted for transferring within the peer-to-peer network (10).

11. A non-transitory computer program product storing code instructions for executing a method according to claim 1 for continuously playing on the client device (11) a content broadcast within the peer-to-peer network (10) of said client devices (11, 12) when said code instructions are executed on a computer.

12. A non-transitory storage means readable by a computing device on which a computer program is stored, said computer program comprising code instructions for executing a method according to claim 1, for continuously playing, on the client device (11), a content broadcast within the peer-to-peer network (10) of said client devices (11, 12).

* * * * *